United States Patent
Citurs et al.

[11] Patent Number: 6,044,670
[45] Date of Patent: Apr. 4, 2000

[54] THEFT PREVENTION DEVICE

[76] Inventors: Kirk A. Citurs, 443 210th St.; Jeffrey D. Baker, 316 225th St., both of Scranton, Iowa 51462

[21] Appl. No.: 09/228,599

[22] Filed: Jan. 12, 1999

[51] Int. Cl.[7] .................................................. B65D 55/14
[52] U.S. Cl. .......................... 70/169; 70/232; 215/360; 220/236; 411/55; 411/910
[58] Field of Search .............................. 70/231, 232, 163, 70/169, 173; 215/360; 220/236, 237; 411/55, 910

[56] References Cited

U.S. PATENT DOCUMENTS

| | | | |
|---|---|---|---|
| 3,130,571 | 4/1964 | Neumann | 70/58 |
| 3,540,245 | 11/1970 | Pope | 70/231 |
| 4,035,921 | 7/1977 | Williams | 70/167 X |
| 4,160,511 | 7/1979 | Hukuta et al. | 70/167 X |
| 4,884,422 | 12/1989 | Walter | 70/231 X |
| 5,261,259 | 11/1993 | Ployd | 70/58 |
| 5,802,895 | 9/1998 | Osgood | 70/259 |

FOREIGN PATENT DOCUMENTS

| | | | |
|---|---|---|---|
| 8702 | 1/1981 | Japan | 70/232 |
| 2194827 | 3/1988 | United Kingdom | 70/232 |
| 2220720 | 1/1990 | United Kingdom | 70/232 |

*Primary Examiner*—Lloyd A. Gall
*Attorney, Agent, or Firm*—Zarley, McKee, Thomte, Voorhees & Sease

[57] ABSTRACT

A theft prevention device is provided for an anhydrous ammonia tank having a feed pipe with an open end. The theft prevention device includes a plug body which is inserted into the open end of the feed pipe. The plug body includes a flexible member which can be expanded by a keyed lock actuator so as to engage the interior of the feed pipe and prevent removal of the plug member. Locking and unlocking of the plug member to the interior of the feed pipe can be accomplished only by use of a key having a predetermined configuration which fits the keyed lock actuator.

12 Claims, 5 Drawing Sheets

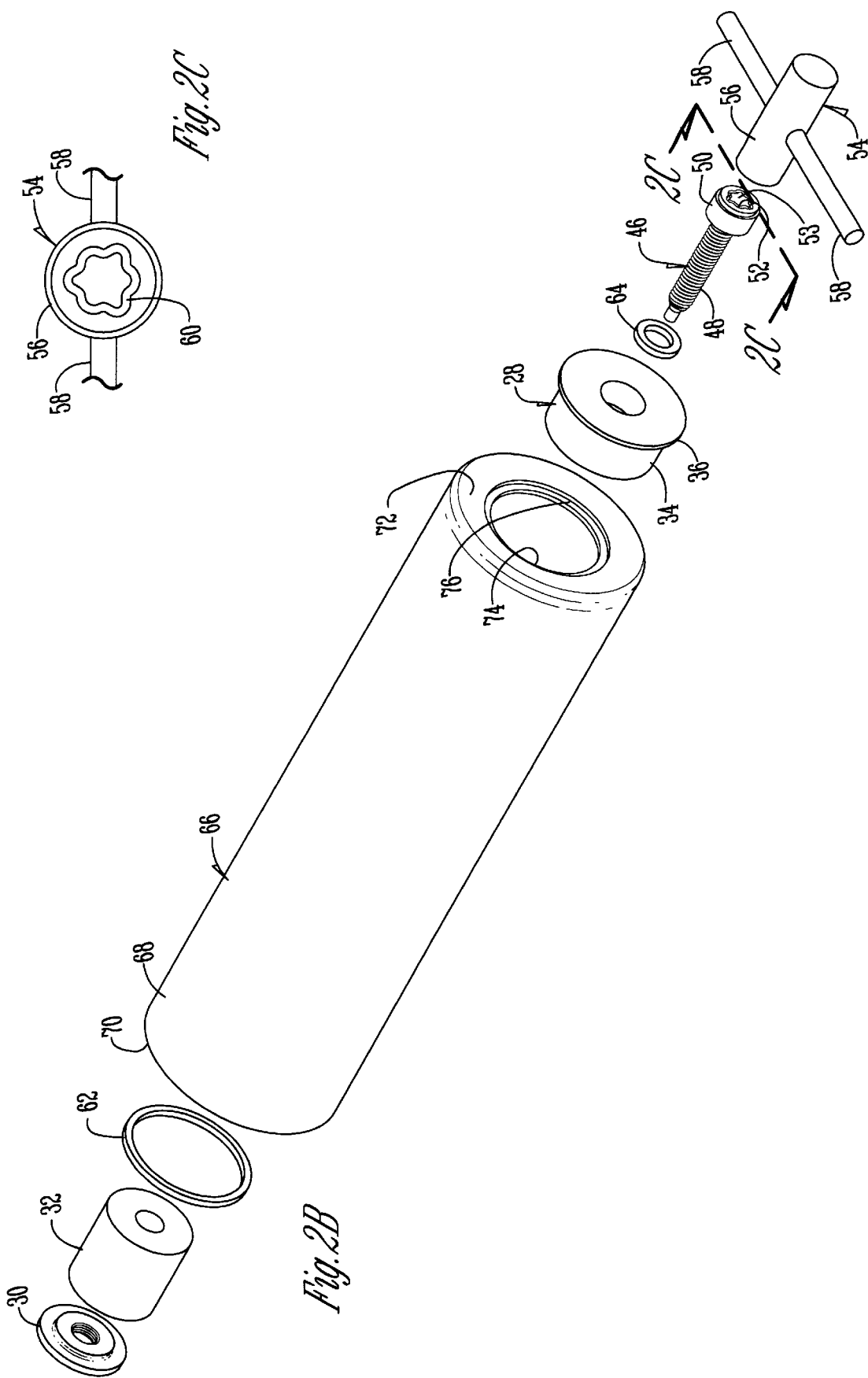

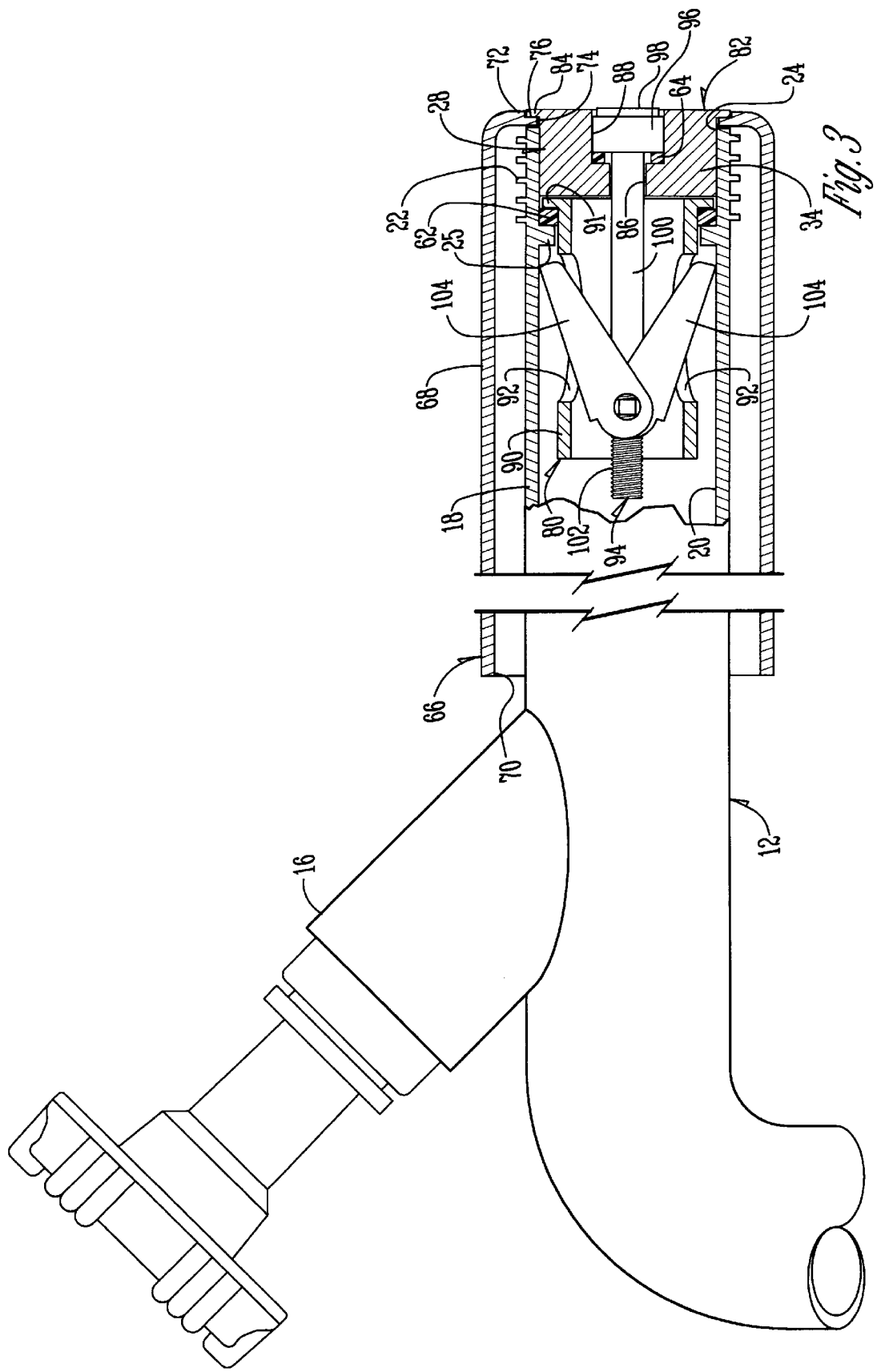

THEFT PREVENTION DEVICE

BACKGROUND OF THE INVENTION

The present invention relates to a theft prevention device, and particularly to a theft prevention device for anhydrous ammonia tanks.

Anhydrous ammonia is an ingredient used for illegal manufacture of methamphetamines. Anhydrous ammonia tanks are used extensively in agricultural, and they are easy targets for theft of anhydrous ammonia.

The fill tubes in most agricultural anhydrous ammonia tanks usually have a threaded cap which can be removed to gain access to the interior of the tank. Thieves can unscrew the cap and remove anhydrous ammonia from the tank through the feed pipe.

Therefore, a primary object of the present invention is the provision of an improved theft prevention device for use in combination with the feed pipe of an anhydrous ammonia tank.

A further object of the present invention is the provision of a theft prevention device which can be easily adapted to presently existing feed pipes of anhydrous ammonia tanks.

A further object of the present invention is the provision of a theft prevention device which also hinders the use of a pipe cutter or saw to remove the end of a feed pipe.

A further object of the present invention is the provision of an improved device which is economical to manufacture, durable in use, and efficient in operation.

SUMMARY OF THE INVENTION

The foregoing objects may be achieved by a theft prevention device made according to the present invention. The device is adapted for use with an anhydrous ammonia tank having a feed pipe comprising an inner cylindrical wall forming a pipe bore, the cylindrical wall having an axial end surrounding a pipe opening.

The theft prevention device includes a plug body, at least a portion of which is sized to fit through the pipe opening into the feed pipe. The plug body comprises a first compression member, a second compression member, and a flexible member positioned therebetween. The flexible member is capable of expanding radially outwardly against the interior cylindrical wall of the feed pipe in response to movement of the first and second compression members toward one another.

A lock actuator is connected to both of the first and second compression members and is movably mounted to the plug member for movement from an unlocked position wherein the first and second compression members exert no compressive force on the flexible member to a locked position causing the first and second compression members to move toward one another and compress the flexible member therebetween so that it expands against and frictionally engages the cylindrical wall of the feed pipe to prevent removal of the plug from the feed pipe.

The lock actuator includes a key receptacle shaped to receive a key of predetermined configuration. The key is adapted to fit the key receptacle for engaging the lock actuator to move the lock actuator between its locked and unlocked positions.

Other devices than a flexible member may be used to grip the pipe and lock the plug in place. For example the wings of a toggle bolt may be used to retentively hold the plug member inside the end of the feed pipe.

BRIEF DESCRIPTION OF THE FIGURES OF THE DRAWINGS

FIG. 2B is an exploded perspective view of the parts of the theft prevention device.

FIG. 2C is an end view taken along line 2C—2C of FIG. 2B.

FIG. 3 is a view similar to FIG. 2, but showing an alternative form of the theft prevention device.

DETAILED DESCRIPTION OF THE PREFERRED EMBODIMENT

Figure 1:
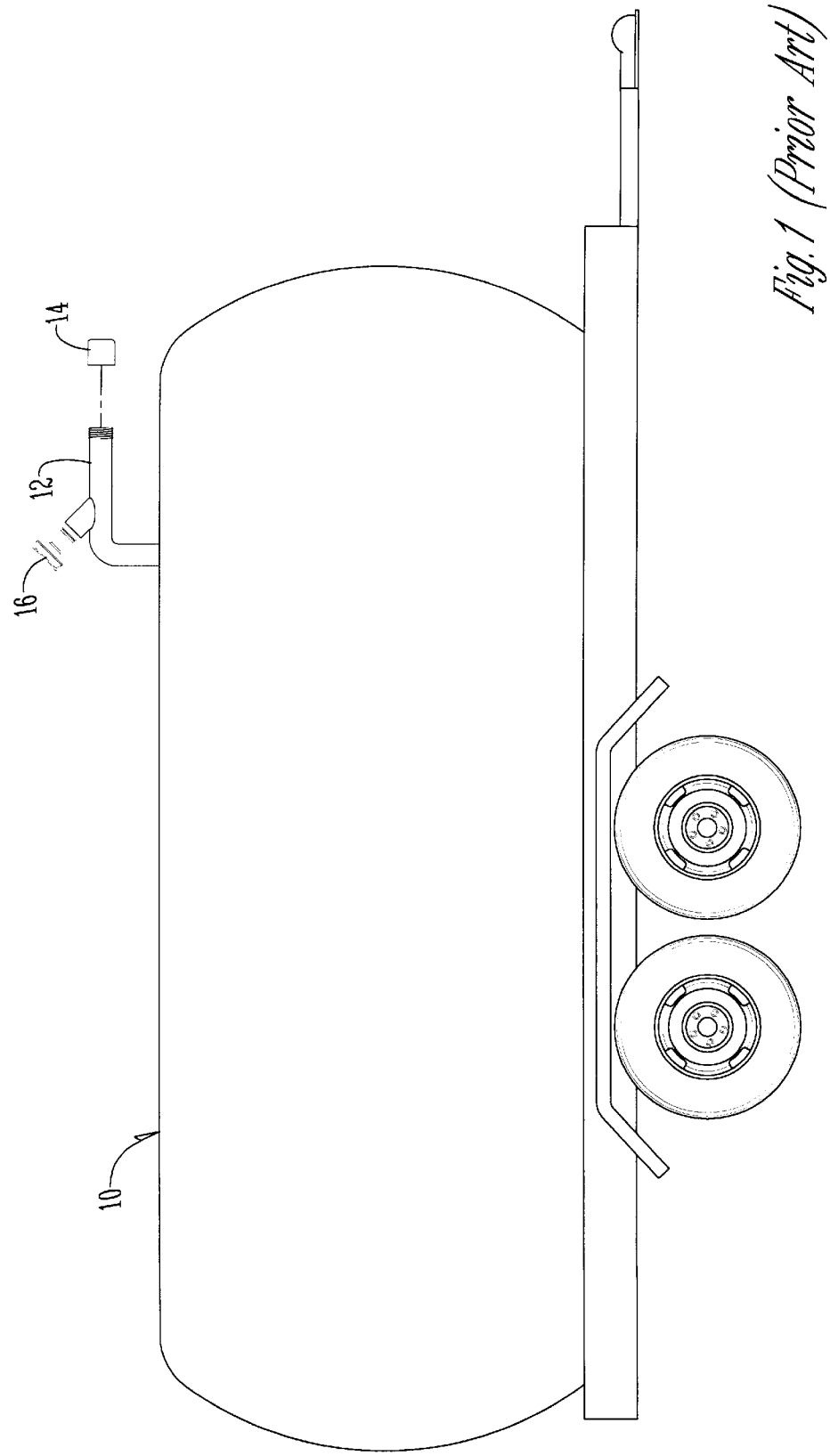
FIG. 1 is a side elevational view of a typical anhydrous ammonia tank having a feed pipe.

Referring to the drawings, the numeral 10 generally designates a typical anhydrous ammonia tank used for agricultural purposes. Tank 10 includes a feed pipe 12 having a cap 14 threadably mounted thereon. A valve 16 is typically provided in the feed pipe for opening and closing pipe 12 to access to the interior of the anhydrous ammonia tank 10.

Feed pipe 12 includes a cylindrical wall 18 (FIG. 2) having a pipe bore 20 on the interior thereof. Pipe 12 is provided with a threaded end 22 forming a pipe opening 24. On the interior surface of the cylindrical wall 18 is an interior flange 25. Some feed pipes include this annular rim 25 and others do not. The present invention is adapted for use with either type of feed pipe.

Inserted within the pipe opening 24 is a plug member 26 which is comprised of a plug cap 28, a plug washer 30, and a flexible member 32 which is positioned between the plug cap 28 and the plug washer 30. Plug cap 28 includes a shank 34 and a rim flange 36. The shank 34 telescopically fits within the pipe bore 20 and the rim flange 36 is sized so as to limit inward movement of the plug member 26 into the feed pipe 12. Extending through the plug cap 28 is a cap bore 38 having a cap counter bore 40 at its outer axial end.

Flexible member 32 is provided with a flexible member bore 42 which is axially aligned with the cap bore 38.

Washer 30 includes a threaded washer bore 44 which also is aligned with bores 42 and 38 so that the three bores 38, 42 and 44 combine to create a single elongated bore extending through the plug member 26.

Extending through bores 38, 42, 44 is a bolt 46 having a threaded shank 48 and a bolt head 50. Bolt head 50 is provided with a key receptacle 52 (shown in FIG. 2B). Key receptacle 52 is of irregular shape and is of predetermined configuration for receiving a key 60 of the same configuration. The bolt head 50 is also provided with a smooth axial end surface 53 so that the bolt head cannot be turned easily without the use of a key.

A wrench 54 includes a wrench body 56 and a wrench handle 58. Key 60 is provided in the axial end of wrench body 56 and is adapted to fit the key receptacle 52 in bolt head 50.

Figure 2:
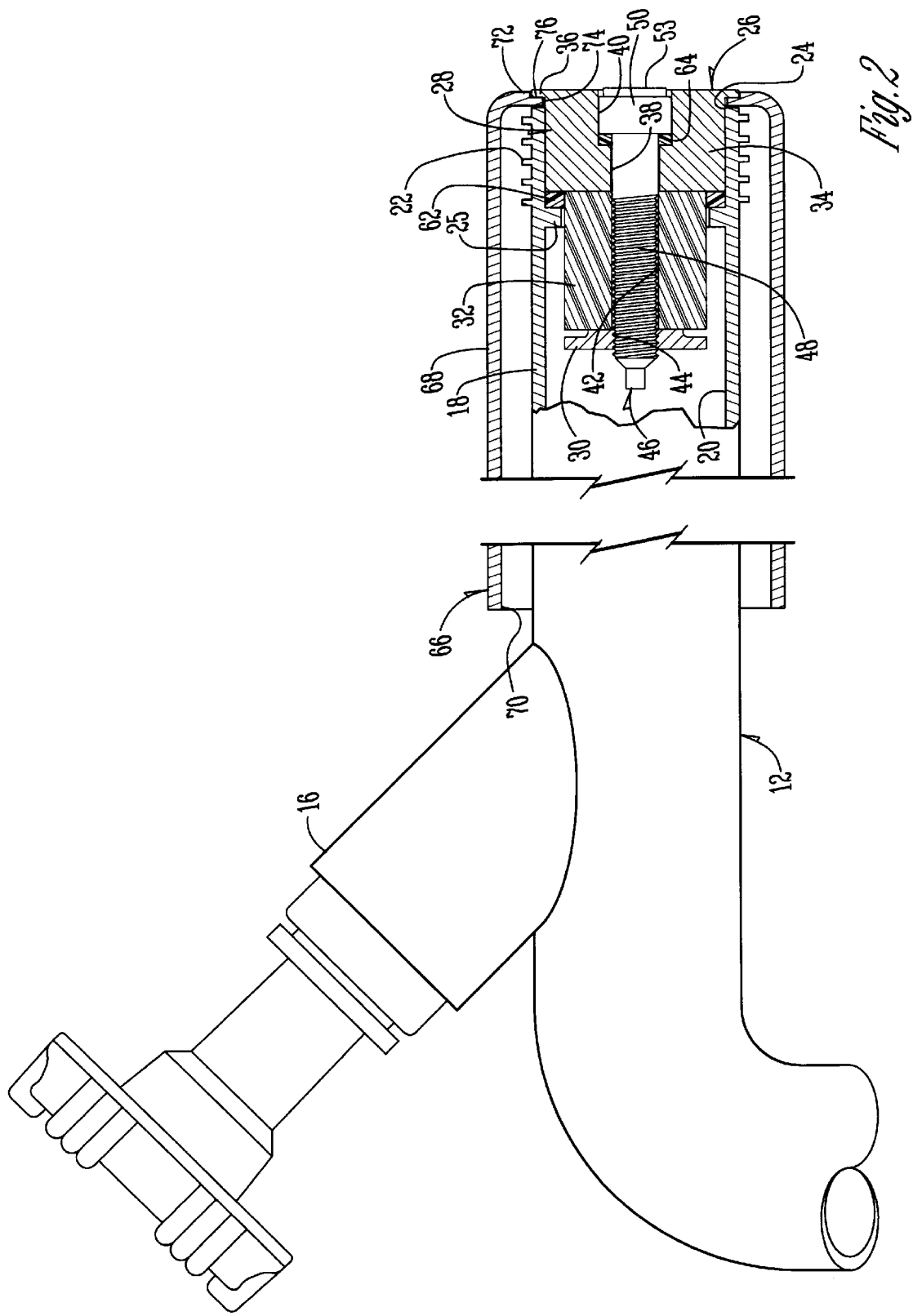
FIG. 2 is a sectional view of the anhydrous ammonia feed pipe having the theft prevention device inserted therein.

A washer 62 is shown in FIG. 2 between the flange 25 and the plug cap 28. However, if flange 25 is not included in the feed pipe 12, then washer 62 need not be utilized.

A washer 64 is fitted over the threaded bolt 46 and is embraced between the bolt head 50 and the inner axial end of the cap counter bore 40.

A sleeve 66 includes a tubular body 68 having an open end 70 at one end and an end plate 72 at the opposite end. End plate 72 is provided with a plug opening 74 which is surrounded by a circular depression 76.

As can be seen in FIG. 2, the sleeve 66 is mounted over the outside of the feed pipe 12, and the end plate 72 of sleeve 66 is positioned between the threaded end 22 of the feed pipe and the rim flange 36 of the plug member 26. The rim flange 36 and the circular depression 76 are sized so that the rim flange 36 fits within the circular depression 76 and presents a smooth outer surface to the exterior axial end of the sleeve 66.

The plug member 26 may be utilized as a theft prevention device without the sleeve 66, but it is preferred that the sleeve 66 be utilized in combination with the plug member 26.

In operation, the cap 14 is removed from the feed pipe 12. The plug member is inserted into the threaded end 22 of the feed pipe 12, either with or without the sleeve 66 shown in FIG. 2.

Figure 2A:
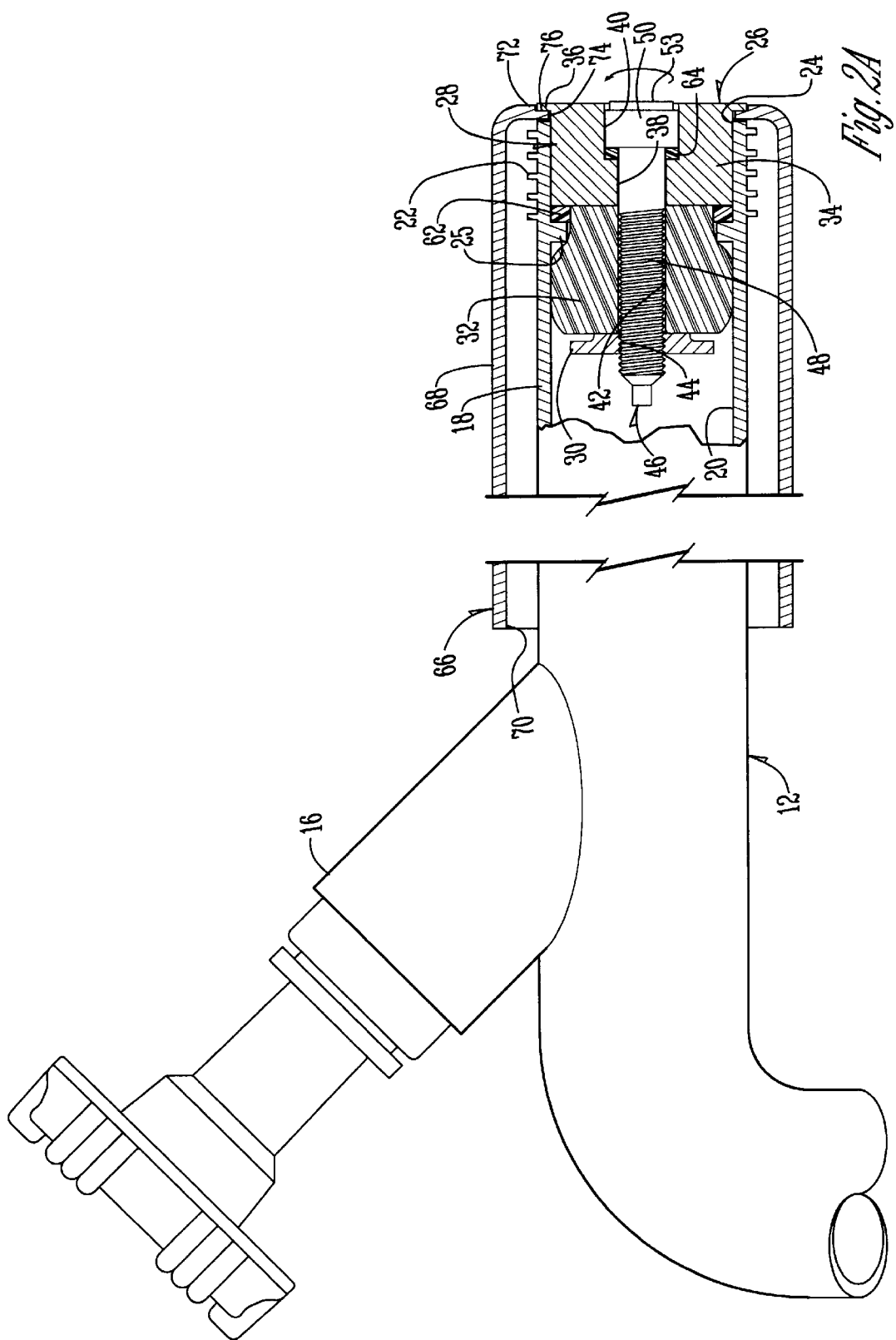
FIG. 2A is a view similar to FIG. 2, but showing the theft prevention device in its locked position.

Wrench 54 is then used to insert the key 60 into the key receptacle 52 of the bolt 46. Rotation of bolt 46 in a clockwise direction causes the plug washer 30 to move axially toward the plug cap 28 thereby compressing the flexible member 32 and causing it to expand radially outwardly against the interior surface of the bore 20 of feed pipe 12 as shown in FIG. 2A. This frictional engagement locks the plug member 26 within the end of the feed pipe 12. All that is exposed to a potential thief is the smooth surface 53 of the bolt head 50, the smooth outer axial end of the plug cap 28, and the smooth axial surface presented by end plate 72 of sleeve 66. A potential thief cannot rotate the bolt 46 without having an appropriate key to fit receptacle 60.

If sleeve 66 is not used, then a smooth surface is presented by the axial outer end of plug cap 28 and the smooth end surface 53 of bolt 46. In either case the potential thief can only rotate the bolt 46 with an appropriate key.

Referring to FIG. 3, a modified plug 80 is shown. Plug 80 includes an end cap 82 having a flange 84 and a bore 86 extending therethrough. Bore 86 includes a counter bore 88. A plug cylinder 90 includes a cylinder flange 91 which engages the end cap 82. Plug cylinder 90 also includes side openings 92.

A toggle bolt 94 includes a head 96 having a key receptacle 98 similar to the key receptacle 60 shown in FIG. 2C. Toggle bolt 94 includes a shank 100 having a threaded end 102. A pair of hinged wings 104 are threaded over the threaded end 102 in conventional fashion. Wings 104 are spring loaded so as to spring outwardly. This permits the toggle bolt 94 to be inserted into the plug cylinder 90 so that the wings 104 can spring radially outwardly to the position shown in FIG. 3. The wings 104 then engage the flange 25 to prevent removal of the plug from the feed pipe 12.

The plug 80 can be removed from the feed pipe by rotating the toggle bolt 94 in a counterclockwise direction to move the juncture of the wings 104 to the left as viewed in FIG. 3. This causes the wings to be forced radially inwardly so as to permit removal of the modified plug 80 from the feed pipe 12.

In the drawings and specification there has been set forth a preferred embodiment of the invention, and although specific terms are employed, these are used in a generic and descriptive sense only and not for purposes of limitation. Changes in the form and the proportion of parts as well as in the substitution of equivalents are contemplated as circumstances may suggest or render expedient without departing from the spirit or scope of the invention as further defined in the following claims.

What is claimed is:

1. A combination comprising:
   an anhydrous ammonia tank;
   a feed pipe connected to said tank and comprising an interior cylindrical wall forming a pipe bore, said cylindrical wall having an axial end surrounding a pipe opening;
   an interior flange connected to said feed pipe and having a flange surface presented axially inwardly with respect to said pipe bore;
   a sleeve having a sleeve side wall surrounding said feed pipe and a sleeve end wall adjacent said pipe opening, said sleeve end wall having a sleeve opening therein;
   a plug body comprising a first plug member, a second plug member, and a flexible member extending through said sleeve opening, said first plug member having a portion which engages said end wall of said sleeve to limit the extent to which said plug body can extend through said sleeve opening, said flexible member extending axially inwardly beyond said interior flange surface;
   said first and second plug members being movable from an unlocked position to a locked position;
   said flexible member being capable of expanding radially outwardly to retentively engage said interior flange surface and prevent removal of said plug body from said feed pipe in response to movement of said first and second plug members from said unlocked position to said locked position;
   a lock actuator connected to both of said first and second plug members and being movably mounted to said plug body for causing movement of said first and second plug members from said unlocked position to said locked position;
   said lock actuator having a key receptacle therein, said key receptacle being shaped to receive a key of predetermined configuration;
   a key of predetermined configuration which fits said key receptacle for moving said first and second plug members between said locked and said unlocked positions.

2. A combination according to claim 1 wherein said flexible member is positioned between said first and second plug members, said first and second plug members moving toward one another during movement from said unlocked position to said locked position.

3. A combination according to claim 2 wherein said flexible member is axially compressible and radially expandable in response to movement of said first and second plug members from said unlocked position to said locked position.

4. A combination according to claim 1 wherein said sleeve is rotatable with respect to said first plug member.

5. A combination according to claim 4 wherein said sleeve completely covers said feed pipe adjacent said axial end of said feed pipe.

6. A combination according to claim 5 wherein said portion of said first plug member engaging said end wall of said sleeve includes a plug end surface and said end wall of said sleeve includes an exterior sleeve end wall surface which is flush with said plug end surface to form a smooth continuous surface therewith.

7. A combination according to claim 6 wherein said lock actuator includes a lock actuator end surface which is flush with said plug end surface and said exterior sleeve end wall surface.

8. A combination according to claim 1 wherein a plug bore extends through said first and second plug members and said flexible member, said lock actuator extending through said plug bore.

9. A combination according to claim 8 wherein said lock actuator includes an inner end adjacent said first plug member and an outer end adjacent said second plug member, said key receptacle being located at said inner end of said lock actuator.

10. A combination according to claim 9 wherein said key receptacle is positioned to be accessible from outside said feed pipe so that said key may be inserted into said key receptacle from outside said pipe.

11. A combination according to claim 8 wherein said actuator comprises a threaded bolt extending through said plug bore.

12. A combination according to claim 11 wherein said threaded bolt threadably engages said second plug member whereby rotation of said threaded bolt in one direction causes said first and second plug members to move toward one another and rotation of said threaded bolt in the opposite direction causes said first and second plug members to move away from one another.

* * * * *